(12) United States Patent
Bourgeois et al.

(10) Patent No.: US 6,811,763 B2
(45) Date of Patent: Nov. 2, 2004

(54) CONVERSION OF SODIUM BROMIDE TO ANHYDROUS HYDROBROMIC ACID AND SODIUM BISULFATE

(75) Inventors: Daniel Martin Bourgeois, Mason, OH (US); Corey James Kenneally, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 184 days.

(21) Appl. No.: 10/265,812

(22) Filed: Oct. 7, 2002

(65) Prior Publication Data

US 2004/0067191 A1 Apr. 8, 2004

(51) Int. Cl.[7] .................................................. C01B 7/09
(52) U.S. Cl. ........................ 423/482; 423/481; 423/488; 423/520; 423/521; 423/551
(58) Field of Search ................................. 423/481, 482, 423/488, 520, 521, 551

(56) References Cited

U.S. PATENT DOCUMENTS

| | | | |
|---|---|---|---|
| 807,640 A | 12/1905 | Roberts | |
| 1,379,731 A | 5/1921 | Thelmer | |
| 2,705,670 A | 4/1955 | Chao | |
| 3,222,276 A | 12/1965 | Belohlav et al. | |
| 3,445,188 A | * 5/1969 | Heintz et al. | 423/482 |
| 3,756,930 A | 9/1973 | Weiss et al. | |
| 3,954,577 A | 5/1976 | Levine | |
| 4,053,376 A | 10/1977 | Carlin | |
| 4,069,120 A | 1/1978 | Meyerand, Jr. et al. | |
| 4,203,813 A | 5/1980 | Grantham | |
| 4,788,323 A | * 11/1988 | Suzukamo et al. | 560/124 |
| 5,003,116 A | * 3/1991 | Stahly | 570/194 |
| 5,304,359 A | * 4/1994 | Duyvesteyn et al. | 423/22 |
| 5,385,650 A | * 1/1995 | Howarth et al. | 205/619 |

* cited by examiner

Primary Examiner—N. M. Nguyen
(74) Attorney, Agent, or Firm—Armina E. Matthews; Brahm J. Corstanje; Kim William Zerby

(57) ABSTRACT

Process for the conversion of sodium bromide to anhydrous hydrobromic acid and sodium bisulfate, said process with the following sequential steps: reaction of sodium bromide and sulfuric acid in a solution of water to produce hydrobromic acid and sodium bisulfate wherein the conversion rate is greater than about 95%; separation of hydrobromic acid and water from the sodium bisulfate; separation of hydrobromic acid from water; and drying of hydrobromic acid.

21 Claims, No Drawings

CONVERSION OF SODIUM BROMIDE TO ANHYDROUS HYDROBROMIC ACID AND SODIUM BISULFATE

FIELD OF INVENTION

The present invention relates to the conversion of sodium bromide to hydrobromic acid and sodium bisulfate with improved product quality and improved process economics.

BACKGROUND OF THE INVENTION

Hydrobromic acid is widely used as an intermediate in the chemical industry. It is utilized in the production of inorganic bromides by reaction with metal hydroxides, oxides, or carbonates; in the production of organic bromides by reaction with alkyl alcohols or alkenes; and as a catalyst for oxidations, alkylations, and condensations in organic chemistry.

In the past, halogenated acids such as hydrobromic acid have been prepared in gaseous form by several laboratory methods such as direct combination of hydrogen and bromide, using platinized silica gel as a catalyst; bromination of organic compounds such as benzene, naphthalene, or tetrahydro-napthalene; and reacting bromine with red phosphorus and water. None of these processes are practical for the industrial production of hydrobromic acid. The first process is generally expensive and presents a considerable explosion hazard. The second process is inefficient and costly in that it typically utilizes only about half of the expensive bromine employed. The last is apt to be violent, difficult to control, and may present a serious explosion hazard.

Currently, there are two main approaches for the industrial production of hydrobromic acid. The first approach is a two conversion process whereby low purity, natural deposits of sodium bromide are converted first into elemental bromine and second into hydrobromic acid. The first conversion is done by oxidation with chlorine, where the sodium bromide is converted into sodium chloride and bromine by the reaction:

$$2NaBr+Cl_2 \rightarrow 2NaCl+Br_2$$

According to Stanford Research Institute's Chemical Economics Handbook, commercial bromine suppliers such as Great Lakes Chemicals (located in El Dorado and Marysville, Ak.), Albemarle (located in Magnolia, Ak.), and Dead Sea Bromine Co. (located in Sdom, Israel), currently practice this step. A second conversion involves either burning bromine and hydrogen to form hydrobromic acid, such as discussed in Ullman's Encyclopedia of Industrial Chemistry, 5$^{th}$ edition, 1985, Volume A4, pg. 396, according to the reaction:

$$Br_2+H_2 \rightarrow 2HBr$$

or by an electrolytic process whereby a solution of bromine is converted into hydrobromic acid and oxygen (as disclosed in U.S. Pat. No. 4,069,120 to United Technologies Corporation, issued Jan. 17, 1978 and U.S. Pat. No. 4,203, 813 to United Technologies Corporation, issued May 20, 1980), according to the reaction:

$$2Br_2+2H_2O \rightarrow 4HBr+O_2$$

This two conversion process to produce hydrobromic acid has a number of drawbacks. First, operating and capital costs are high since a separate manufacturing plant is employed for each conversion. In addition, if bromine burning is implemented, free bromine is often present in the hydrobromic acid product, resulting in a product with the characteristic yellow and/or orange color associated with free bromine. This is generally unacceptable for applications requiring a colorless hydrobromic acid product.

The second approach for chemical manufacture of hydrobromic acid is a one conversion process whereby high purity sodium bromide is reacted with sulfuric acid (U.S. Pat. No. 1,379,731 to Lowenstein Radio Corporation, issued May 31, 1921 and U.S. Pat. No. 2,705,670 to American Cyanamid, issued Apr. 5, 1955) according to the reaction:

$$NaBr+H_2SO_4 \rightarrow HBr+NaHSO_4$$

This approach is well suited for industrial companies which produce high purity sodium bromide as a by-product and desire hydrobromic acid as a product. However, this approach has a number of drawbacks as well. Operating costs are high if the sodium bisulfate salt is of low purity and therefore has low value. This can occur if (a) there is unreacted sodium bromide in the sodium bisulfate, (b) some of the sodium bisulfate reacts with sodium bromide to produce sodium sulfate, according to the reaction:

$$NaHSO_4+NaBr \rightarrow HBr+Na_2SO_4$$

or, (c) the sodium bisulfate undergoes decomposition to sodium disulfate via the following reaction, $$2NaHSO_4 \rightarrow Na_2S_2O_7+H_2O$$

Capital costs of the approach are high if the total number of separation steps required to purify the hydrobromic acid and sodium bisulfate are not minimized. Lastly, product quality may also be an issue if low levels of bromine are entrained in the hydrobromic acid via the following reaction, $$2HBr+H_2SO_4 \rightarrow Br_2+SO_2+2H_2O$$

Generally, entrained bromine is removed from hydrobromic acid by scrubbing with phosphoric acid or by activated carbon.

Therefore, there is a continuing need for an improved process approach for making anhydrous hydrobromic acid and sodium bisulfate. Specific areas for improvement vs. current commercial processes include lowering operating cost, lowering capital cost, and increasing product purity.

SUMMARY OF THE INVENTION

It has now surprisingly been discovered that sodium bromide can be converted into anhydrous hydrobromic acid and sodium bisulfate with minimal levels of by-products such as bromine, sodium sulfate, or sodium disulfate by using a one conversion process consisting of a simple reactor and three simple separation processes.

The present invention therefore relates to a process for the conversion of sodium bromide to hydrobromic acid and sodium bisulfate with the following steps:

1) Reaction of sodium bromide and sulfuric acid in a solution of water to produce hydrobromic acid and sodium bisulfate.

2) Separation of hydrobromic acid and water from the sodium bi sulfate

3) Separation of hydrobromic acid from water; and

4) Drying of hydrobromic acid

These and other features, aspects, and advantages of the present invention will become evident to those skilled in the art from a reading of the present disclosure.

All documents cited are, in relevant part, incorporated herein by reference; the citation of any document is not to be construed as an admission that it is prior art with respect to the present invention.

DETAILED DESCRIPTION OF THE INVENTION

While the specification concludes with the claims particularly pointing and distinctly claiming the invention, it is believed that the present invention will be better understood from the following description.

All percentages and ratios used herein are by weight of the total composition and all measurements made are at 25° C., unless otherwise designated.

Without being limited by theory, it is believed that economical, commercial production of anhydrous hydrobromic acid from concentrated sodium bromide is best accomplished by: a one conversion process (which avoids elemental bromine as an intermediate) that (a) maximizes the yield and purity of both hydrobromic acid and sodium bisulfate, and (b) minimizes the number of unit operations in the overall process.

These objectives are accomplished by: (a) high conversion of sodium bromide using a single, simple reactor, whereby the conversion is greater than about 95%, preferably greater than about 99%, (b) selective production of hydrobromic acid with less than about 200 ppm bromine and greater than about 95% theoretical yield of hydrobromic acid, preferably with no detectible level of bromine and greater than about 98% theoretical yield, (c) selective production and separation of sodium bisulfate with greater than 92% purity and 95% theoretical yield of sodium bisulfate, preferably with purity greater than 95% and 98% theoretical yield, and (d) preferably accomplishing all of the separations using commercially available or easily constructed separation devices, preferably three or fewer devices, more preferably all conducted in a liquid product state.

The present invention has several advantages over the current practice. High conversion of sodium bromide in a single, simple reactor is advantageous over the two conversion process and also the existing one conversion process in the case of substantially lower sodium bromide conversion which requires separation and recycle steps for the unreacted sodium bromide and sulfuric acid. The selective production of hydrobromic acid with minimal bromine levels is advantageous over current practice where higher levels of bromine are present from both a process materials standpoint (bromine is more corrosive) and from a product quality standpoint. The selective production of sodium bisulfate with minimal sulfate or disulfate contaminants is advantageous to maximize the value of the salt via use in the broadest variety of applications, including food and beverages. Finally, the use of preferably three or fewer separation devices, more preferably in the liquid state, is advantageous over the current practice of using one or more liquid/solid separation devices, which are generally more expensive and of lower reliability than the liquid separation devices.

The processes and methods herein may also include a wide variety of other variations. The processes and methods of the present invention, are described in detail hereinafter.

The present invention relates to a process for the converting sodium bromide and sulfuric acid in a solution of water, under specified conditions, in order to produce hydrobromic acid and sodium bisulfate. The steps of such process are as follows:

I. Reaction of Sodium Bromide and Sulfuric Acid in a Solution of Water to Produce Hydrobromic Acid and Sodium Bisulfate.

All reactants and products according to the conversion of sodium bromide and sulfuric acid to produce hydrobromic acid and sodium bisulfate process outlined herein are soluble in water up to about 0.9 parts by weight NaBr/1 part H2O, and about 1.0 parts by weight sodium bisulfate/1 part H2O.

The reaction process consists of the blending of water, sodium bromide, and sulfuric acid in a single miscible phase, resulting in complete conversion of reactants to their respective products. A variety of different reactor designs can be used, including tanks, columns, and pipes, with a wide range of length/diameter ratios. One example of a commercially available device is the Buss Loop Reactor supplied by Davy Process Technology (Switzerland) AG. Internal blending devices useful herein include baffles, agitators and jets for tanks and columns; and orifice plates, segmented baffles, or static mixers for columns and pipes. Suitable agitators for tanks and columns include helical ribbons, screws, or anchors for laminar mixing; and turbines, propellers, or hydrofoils for turbulent mixing. Suitable static mixers for pipes include the multi-element, helical design from Kenics. An industry guideline is that blending of miscible solutions is generally excellent after about 6–20 static mixer elements. Alternatively, a pipe reactor can be used with no internals for blending but with turbulence provided solely by high throughput velocity. The high throughput velocity is preferably provided by a pump, such as those commonly known in the art, including centrifugal and positive displacement pumps.

The reactor can be backmixed or plug flow, but backmixing is preferred, since it provides dilution of sodium bromide and sulfuric acid, thereby minimizing the likelihood of degrading hydrobromic acid in the presence of concentrated sulfuric acid to produce free bromine and sulfur dioxide. Both batch and continuous reactors can be used. The reactor can be designed for adiabatic or isothermal operation, the latter with a jacket or heat exchanger to remove the heat of reaction. The degree of blending required for complete conversion is a complex function of the type of reactor used, geometry factors, and fluid properties. For a turbine-agitated baffled tank operating in the turbulent regime (impeller Reynold's number>about $10^4$), about 30 seconds of contact time is sufficient. By contrast if operating in the laminar regime (impeller Reynold's number<about 10), or the transition regime (impeller Reynold's number from about 10 to about $10^4$), mixing time is generally about 2–20 times longer. Mixing guidelines for miscible fluids using different agitators or liquid jets can be found in the textbook, "Unit Operations of Chemical Engineering", by McCabe and Smith, Third Edition, McGraw-Hill, 1976, pp. 248–249.

A preferred reactor is an adiabatic loop reactor, which is a continuous, recirculating tubular reactor with backmixing. The feed rate and outlet rate are balanced so that accumulation is kept constant in the loop. The Reynolds number is greater than about $10^3$, preferably greater than about $10^4$, thereby providing what is commonly referred to as a "turbulent flow regime." The recirculation rate is about ten times the combined feed rate of the sodium bromide, water, and sulfuric acid, preferably about twenty times, more preferably about thirty times the combined feed rate. The residence time in the loop is between about 0.2 and about 20 minutes, preferably between about 0.5 and about 10 minutes, most preferably between about 1 and about 5 minutes.

Conversion of reactants to their respective products is greater than about 95%, preferably greater than about 99%. In order to achieve this conversion, the ratio of sulfuric acid to sodium bromide is kept stoichiometric, and the ratio of water to sodium bromide is kept below the solubility limit of about 0.9 parts by weight sodium bromide/1 part $H_2O$. Preferably, the ratio is kept below about 0.65 parts by weight sodium bromide/1 part $H_2O$ (or about 0.4 parts sodium bromide/1 part solution) in order to eliminate any traces of bromine and sulfur dioxide in the hydrobromic acid. Sulfuric acid may be of high concentration (about 97%) or it may be of lower concentration. The sulfuric acid may be added all at once to the sodium bromide solution, or it may be added slowly over time. Preferably, the sulfuric acid is added slowly over time in order to minimize the likelihood of degrading hydrobromic acid in the presence of concentrated sulfuric acid to free bromine and sulfur dioxide. Temperature for the reaction is from about 20° C. to about 180° C., preferably from about 20° C. to about 100° C. at one atmosphere pressure, more preferably from about 70° C. to about 100° C. at one atmosphere pressure.

II. Separation of Hydrobromic Acid and Water from the Sodium Bisulfate.

Coming out of the reaction step, a miscible solution of hydrobromic acid, sodium bisulfate, and water is present. The first separation is conducted between sodium bisulfate and hydrobromic acid/water. Suitable devices for the separation include evaporators and dryers, where liquid/liquid or liquid/solid separation between volatiles and non-volatiles is done using either single or multiple equilibrium stages. Other liquid/solid separation devices such as crystallizers, centrifuges, and filters may be used, but the evaporators and dryers are preferred, as the crystallizers, centrifuges and filters all require some removal of volatile material before a solid precipitate can be removed.

Suitable types of evaporators are reviewed in Chapter 11 of "Perry's Chemical Engineers Handbook", by Green (ed), McGraw-Hill, 7th edition. These include forced circulation, vertical and horizontal tube (including rising film and falling film evaporators), jacketed kettles, and agitated thin film devices (i.e. wiped film evaporators from Pope Scientific and the Rototherm® by Artisan Industries). Suitable types of dryers are reviewed in Chapter 12 of Perry's and include pan dryers, indirect rotary dryers, fluidized beds, spray dryers, and drum dryers. One can select a single type of device for the separation or a combination of two or more devices, i.e. a falling film evaporator in combination with a spray dryer.

A preferred separation device is a forced circulation evaporator, which is designed to handle corrosive solutions and crystalline products. Non-circulating evaporators are better suited for clear liquids with no crystalline product. The evaporator can be either single effect or multiple effect, the latter having the vapor from one effect as the heating medium for another effect in which boiling takes place at a lower temperature and pressure.

Evaporation temperatures and pressures are dependent on the residual moisture specification for the sodium bisulfate salt. For monohydrate salt, temperatures and pressures are from about 20° C. to about 183° C. and from about 0.002 atm to about 5 atm. respectively. For anhydrous salt, temperatures and pressures are from about 80° C. to about 183° C. and from about 0.002 atm to about 1 atm respectively. Preferably, the temperature is from about 60° C. to about 183° C. for the monohydrate salt and from about 140° C. to about 183° C. for the anhydrous salt so that the salt is in a molten form and crystallized solids are not present. Processing the salt in a molten state minimizes the chances of fouling in a forced circulation evaporator and also allows the opportunity to use non-circulating evaporators for the separation. In addition, processing the salt in a molten state is preferable for separating low levels of hydrobromic acid and water from the salt. Residence times in the evaporator are from about 2 seconds to about 20 minutes, preferably from about 10 seconds to about 1 minute. Residual moisture content for the anhydrous salt is less than about 2%, preferably less than about 1%, more preferably less than about 0.5%.

Care must be taken to avoid thermal decomposition of the sodium bisulfate to form sodium disulfate. According to Ullman's Encyclopedia of Industrial Chemistry, 5th edition, 1985, Volume A24, pg. 366, this transition takes place near the melt point of anhydrous sodium bisulfate (about 183° C.) and is complete after heating for approximately four hours at from about 240° C. to about 260° C. Accordingly, exposure to temperatures above about 180° C. during the evaporation step should be kept to less than about ten minutes, preferably less than about five minutes, and more preferably less than about one minute.

III. Separation of Hydrobromic Acid from Water.

Separation of hydrobromic acid from water can be accomplished using a number of different approaches, including multi-stage distillation, liquid extraction, and membrane separation. Hydrobromic acid forms an azeotrope with water at about 48% acid concentration at one atmosphere pressure. Thus for the case of distillation, azeotropic distillation is required in order to separate hydrobromic acid from water. Approaches for azeotropic distillation include choosing an entraining agent to alter the vapor liquid equilibrium (and optionally the liquid phase miscibility) of hydrobromic acid and water to enable separation of hydrobromic acid, exploiting changes in azeotropic composition with total system pressure, and exploiting curvature in the vapor-liquid equilibrium diagram. For further detail, see Chapter 13 of "Perry's Chemical Engineers Handbook", by Green (ed), McGraw-Hill, 7th edition. Examples of the first approach include ethanol in water and pyridine in water (using benzene as an entrainer). Examples of the second approach include THF in water and ethanol in water. Examples of the third approach include hydrochloric acid in water and nitric acid in water, with sulfuric acid as an entrainer.

Preferably, pressure swing azeotropic distillation is used to separate hydrobromic acid from water. Liquid extraction or membranes may also be used, but these are less preferred due to introduction of additional chemical agents and/or due to high capital and operating costs. Pressure swing azeotropic distillation takes advantage of the fact that the azeotropic composition of hydrobromic acid in water generally decreases upon an increase in pressure. By operating two distillation columns in series at different pressures (the second one at a higher pressure than the first), the composition of hydrobromic acid from the first column will generally be above the azeotropic composition for hydrobromic acid in the second column. This allows one to obtain pure hydrobromic acid out of the second column without running into any barriers from the azeotrope.

Distillation operations are usually carried out in vertical, cylindrical columns or towers in which devices such as plates or packing elements are placed. The vapor and liquid streams normally flow countercurrently and the devices serve to provide the contacting and development of interfacial surface through which mass transfer takes place. Sieve trays, bubble cap trays, structured packing, and loose packing such as rings or saddles are examples of column internals that may be used herein.

Preferred operating conditions for the first column are a pressure of from about 0.01 to about 2 atmospheres and a bottoms temperature of from about 50° C. to about 140° C. As used herein, "tops" refers to the vapor or relatively more volatile stream that is separated from the relatively less-volatile or "bottom" stream in distillation columns. The "tops" is also sometimes referred to as "overhead" in the art. With from about 2 to about 20, preferably from about 3 to about 10, most preferably about 5 separation stages and a mass reflux ratio of from about 0.1 to about 10, preferably from about 0.5 to about 2, most preferably about 1.0, the bottoms composition of hydrobromic acid in water is increased to its azeotrope for the corresponding operating pressure. The tops composition is nearly pure water. Preferred operating conditions for the second column are a pressure of from about 1 to about 20 atmospheres with a bottoms temperature corresponding to the boiling point at a given pressure. With from about 2 to about 20, preferably from about 3 to about 10, more preferably about 5 separation stages and a mass reflux ratio of from about 0.1 to about 10, preferably from about 0.5 to about 5, more preferably about 2.5, the composition of the hydrobromic acid in water is increased from about 48% to about 99% or greater and taken overhead as a nearly anhydrous gas product. The bottoms from the second column are at the azeotropic composition corresponding to its operating pressure and are sent back to the first distillation column as a feed stream.

IV. Drying of Hydrobromic Acid

After the separation of hydrobromic acid from water, there may still be residual moisture in the hydrobromic acid product. In order to produce an anhydrous hydrobromic acid, a drying step is utilized. As referenced herein, "anhydrous" hydrobromic acid according to the present invention has a residual moisture content below about 0.4%, preferably below about 0.2%, more preferably below about 0.1%. In order to produce anhydrous hydrobromic acid, several different approaches can be employed, including distillation, stripping, solids adsorption, gas separation membranes, and gas absorption. Distillation can be used, but is relatively inefficient at removing low levels of moisture from the hydrobromic acid. Stripping with a supercritical gas at low temperatures and high pressures is a more practical and preferred option. Adsorption onto a solid adsorbent is an approach that is commonly used for drying gases. Solid adsorbents, typically in granular, bead, or pellet form, are used in adsorbers with either fixed inventory, intermittent solids flow, or with continuous moving solids flow. The most common are fixed beds operating as batch units or as beds through which the gas passes with period intervention for regeneration. Regeneration is accomplished using either temperature swing (higher temperature during desorption) or pressure swing (lower pressure during desorption). A commercial example of this approach is instrument air dryers which use pressure swing adsorption with either activated alumina or silica gel as the sorbent. A specific, low cost device for adsorption (particularly for removal of VOCs) is the adsorbent wheel. The gas to be treated flows through the wheel parallel to the axis of rotation. Most of the wheel removes adsorbates. The remaining part undergoes thermal regeneration, usually countercurrent. Dehydration of air and other gases is a rapidly growing membrane application. Gas membranes generally work because individual gases differ in their solubility and diffusivity through nonporous polymers. Water is extremely permeable in polymer membranes. Finally, gas absorption, also known as scrubbing, can be used by passing hydrobromic acid vapor through a packed bed or tower in countercurrent flow to a liquid absorbate. As used herein, "liquid absorbate" refers to a liquid stream which absorbs the water vapor into the liquid phase. While a variety of non-volatile liquid streams can be used to absorb moisture, sulfuric acid is a preferred liquid absorbate for this application since it is already used in the reaction process, and the liquid absorbate from the scrubber column can then be used "as is" in the reaction step.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

The following analytical methods are referenced in the examples.

Bromine in aqueous hydrobromic acid. Weigh about 50 grams of sample into a 250 ml. Erlenmeyer flask. Add 20 ml. of a 10% potassium iodide solution in water and 15 ml. of glacial acetic acid. Titrate the liberated iodine with 0.02 Normality sodium thiosulfate until only a slight yellow color of free iodine remains. % Bromine=(ml. of sodium thiosulfate×Normality×79.92)/(10×grams sample).

Hydrobromic acid solution: apparent yield. % yield=[(grams hydrobromic acid solution recovered)/(gr. water added +gr. moles sodium bromide added×80.9)]×100

Sodium bisulfate: apparent purity. Weigh about 1.0 grams of sample into a 250 ml. beaker. Add approximately 75 ml. of distilled water and titrate to pH 7.0 with 0.1 Normality standard sodium hydroxide solution using a pH meter. Calculation: % sodium bisulfate=(ml. of sodium hydroxide×Normality×120.1)/(10×grams sample).

Sodium bisulfate: apparent yield. % yield=(grams solid residue recovered)/(gr. moles sodium bromide added× 120.1)×(100−% sodiumbisulfate moisture)

Sodium bisulfate moisture. Weigh out 1–2 grams of finely ground sample on a small pan. Place in an oven at 210° C. for 30 minutes. Cool and weigh the sample again. Record the difference in weight as a % of total.

Example 1

This example is a batch reaction between sodium bromide and sulfuric acid under conditions where the quality and yield of the hydrobromic acid and sodium bisulfate are maximized. 63.5 grams (0.62 gram moles) of sodium bromide from EM Science were dissolved in 175 grams (9.72 gram moles) deionized water in a 500 ml round bottom flask with a heating mantle, agitator, overhead condenser, receiver flask, and dry ice trap. The mixture was heated to 80° C. with agitation and then 62.1 grams (0.62 gram moles) of 97% sulfuric acid was added dropwise over a period of 20 minutes to the reaction flask. The product in the reactor was colorless through the duration of sulfuric acid addition. After all sulfuric acid was added, the mixture was heated to evaporate hydrobromic acid and water. A steady stream of vapor was condensed from the reactor over a temperature range of 115° C. to 130° C. (The hydrobromic acid/water azeotrope boils at 125° C. at one atmosphere pressure:) The sodium bisulfate salt was further dehydrated in the reactor over a temperature range of 130° C. to 175° C. The melt point of the nearly anhydrous salt was observed to be about 150° C. The apparent yield of the hydrobromic acid solution was 101% and the apparent yield of the sodium bisulfate salt was 98%. The hydrobromic acid/water azeotrope was not purified in the lab. However, an ASPEN computer simulation indicated that hydrobromic acid can be separated from water (up to 99.5% purity) using the following design specs.

|  | Column 1 | Column 2 |
|---|---|---|
| Bottoms pressure, atm | 0.15 | 8.0 |
| Bottoms temperature,° C. | 79 | 188 |

-continued

|  | Column 1 | Column 2 |
|---|---|---|
| Theoretical stages | 5 | 5 |
| Mass reflux ratio | 1.1 | 2.5 |
| % HBr-tops | 0.5 | 99.5 |
| % HBr-bottoms | 49.3 | 37.2 |

Product Analysis

The hydrobromic acid/water solution was titrated with 0.1 N caustic and a strong acid content of 22.3% was measured (vs. a theoretical concentration of 22.2%). Bromine levels were non detectable. Elemental analysis by ICP indicated that the residual sodium and sulfur levels were 10 ppm and 44 ppm, respectively. The sodium bisulfate product was also subjected to elemental analysis using ICP. The sodium and sulfur levels were 19.1% and 26.5% by weight respectively. The apparent purity of the sodium bisulfate was 96%.

Example 2

This example is similar to Example 1 except more concentrated solutions of sodium bromide in water are used in the reaction. As in Example 1, a reaction stoichiometry of 1 mole sulfuric acid to 1 mole sodium bromide was used. Sulfuric acid was added to the sodium bromide solution over a period of 20–40 minutes. Hydrobromic acid solution was evaporated from the sodium bisulfate and the sodium bisulfate was dried to a moisture content of 2% or less. Bromine content and apparent yield of the hydrobromic acid solution was measured, along with apparent purity and apparent yield of the sodium bisulfate.

|  | Hydrobromic Acid Solution | | Sodium Bisulfate | |
|---|---|---|---|---|
| NaBr:H2O mass ratio | Br2 conc. | % Yield | % Purity | % Yield |
| 0.64:1.0 | 0 ppm | 100 | 97.5 | 102 |
| 0.7:1.0 | 92 ppm | 99 | 89.5 | 103 |
| 0.89:1.0 | 105 ppm | 99 | 92.5 | 102 |
| 1.03:1.0 | 143 ppm | 98 | 92.4 | 98 |
| 1.17:1.0 | 234 ppm | 93 | 98.5 | 98 |

The results show that as the concentration of sodium bromide is increased, the concentration of bromine in the hydrobromic acid/water solution is increased proportionally. Also, the yield of hydrobromic acid solution and sodium bisulfate is decreased.

Example 3

This example is similar to the first data point in Example 2 (0.64:1.0 mass ratio of sodium bromide:water) except that the sulfuric acid is added all at once instead of slowly over a period of 20–40 minutes. 27.6 gram of sodium bromide was dissolved in 42.9 grams of water and then 26.3 grams of concentrated sulfuric acid was immediately added to the sodium bromide solution. The free bromine concentration in the hydrobromic acid solution was 81 ppm. This result indicates the rate of addition of sulfuric acid is an important variable to control in the batch process in order to ensure no detectable levels of free bromine.

Example 4

This example is similar to example 1 except that the reactor and the evaporation steps are done in continuous flow rather than in a batch process. 65.8 grams/min (0.64 gram moles/min) of dry sodium bromide and 187.2 grams/min (10.4 gram moles/min) of water were conveyed using a peristaltic pump (Cole Parmer). 67 grams/min (0.66 gram moles/min) of 97% sulfuric acid was conveyed using a second peristaltic pump. The output from the two pumps was combined and fed to a plug flow reactor. The reactor consisted of 3.2 mm id×65 ft long Viton tubing with a residence time of 30 seconds and a Reynolds number of approximately 2100. The crude product from the plug flow reactor was then fed at a rate of approximately 2–5 ml/minute through a 2" wiped file evaporator (Pope Scientific) with an internal condenser. Operating conditions were a pressure of 200 mm Hg and a jacket temperature of 160° C. 75° F. cooling water was circulated through the condenser. The hydrobromic acid and water were vaporized and recondensed and the sodium bisulfate was collected as a powdery, non-volatile residue.

Product Analysis

The crude reaction product was analyzed for bromine content and the result was 112 ppm. The hydrobromic acid/water solution that was flashed and recondensed in the evaporator was titrated with 0.1 N caustic and a strong acid content of 21.3% was measured (vs. a theoretical concentration of 21.7%). The sodium bisulfate residue from the evaporator had an apparent purity of 95%. The moisture level of the sodium bisulfate was 1%.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for the conversion of sodium bromide to anhydrous hydrobromic acid and sodium bisulfate, said process comprising the following sequential steps:
   a) reaction of sodium bromide and sulfuric acid in a solution of water to produce hydrobromic acid and sodium bisulfate wherein the conversion rate is greater than about 95%;
   b) separation of hydrobromic acid and water from the sodium bisulfate;
   c) separation of hydrobromic acid from water; and
   d) drying of hydrobromic acid.

2. A process according to claim 1 wherein the reaction step (a) uses a reactor device selected from the group consisting of tanks, columns, pipes, and mixtures thereof.

3. A process according to claim 2 wherein the reactor device is selected from the group consisting of tanks, columns, and mixtures thereof and further comprises an internal blending device selected from the group consisting of baffles, agitators, jets, and mixtures thereof.

4. A process according to claim 2 wherein the reactor device is selected from the group consisting of columns, pipes, and mixtures thereof, and further comprises a blending internal selected from the group consisting of orifice plates, segmented baffles, static mixers, and mixtures thereof.

5. A process according to claim 1 wherein the reactor device is a pipe and wherein the blending is provided solely by a pump which operates in a turbulent flow regime.

6. A process according to claim 5 wherein the reactor device is an adiabatic loop reactor.

7. A process according to claim 2 wherein the ratio of sulfuric acid to sodium bromide is stoichiometric and the ratio of water to sodium bromide is less than about 0.9 parts by weight sodium bromide to 1 part water.

8. A process according to claim 7 wherein the sulfuric acid is added slowly to the sodium bromide solution.

9. A process according to claim 7 wherein the temperature for the reaction is from about 20° C. to about 180° C. at one atmosphere pressure.

10. A process according to claim 2 wherein the separation of hydrobromic acid and water from the sodium bisulfate step (b) uses a separation device selected from the group consisting of evaporators, dryers, crystallizers, centrifuges, filters, and mixtures thereof.

11. A process according to claim 10 wherein the separation device is selected from the group consisting of evaporators, dryers, and mixtures thereof, wherein the evaporators are selected from the group consisting of forced circulation, vertical and horizontal tube, jacketed kettles, agitated thin film devices, and mixtures thereof and wherein the dryers are selected from the group consisting of pan dryers, indirect rotary dryers, fluidized beds, spray dryers, drum dryers, and mixtures thereof.

12. A process according to claim 11 wherein the separation device is a forced circulation evaporator.

13. A process according to claim 10 wherein the exposure time to temperatures above 180° C during the separation step (b) is less than 10 minutes.

14. A process according to claim 11 wherein the separation device is an evaporator and the sodium bisulfate is in a molten state.

15. A process according to claim 2 wherein the separation of hydrobromic acid from water step (c) uses an approach selected from the group consisting of multi-stage distillation, liquid extraction, membrane separation, and mixtures thereof.

16. A process according to claim 15 wherein the step (c) approach is azeotropic distillation.

17. A process according to claim 16 wherein the step (c) approach is pressure swing azeotropic distillation.

18. A process according to claim 1 wherein the drying of hydrobromic acid step (d) results in a hydrobromic acid product having a moisture content of less than about 0.4% by weight.

19. A process according to claim 18 wherein the drying of hydrobromic acid step (d) uses a drying approach selected from the group consisting of distillation, stripping, solids adsorption, gas separation membranes, gas absorption, or mixtures thereof.

20. A process according to claim 19 wherein the drying step (d) uses absorption.

21. A process for the conversion of sodium bromide to anhydrous hydrobromic acid and a sodium bisulfate coproduct, said process comprising the following sequential steps:

a) reaction of sodium bromide and sulfuric acid in a solution of water to produce hydrobromic acid and sodium bisulfate wherein the conversion rate is greater than about 95% by means of an adiabatic loop reactor and wherein the ratio of sulfuric acid to sodium bromide is stoichiometric and the ratio of water to sodium bromide is less than about 0.9 parts by weight sodium bromide to 1 part water;

b) separation of hydrobromic acid and water from the sodium bisulfate by means of a forced circulation evaporator;

c) separation of hydrobromic acid from water by means of azeotropic distillation; and d) drying of hydrobromic acid.

* * * * *